Dec. 11, 1951 M. A. CROSBY ET AL 2,577,843
METHOD OF MANUFACTURING WIRE CORD
Original Filed March 8, 1943 2 SHEETS—SHEET 1
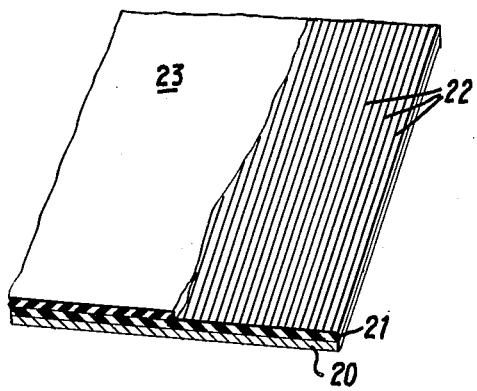
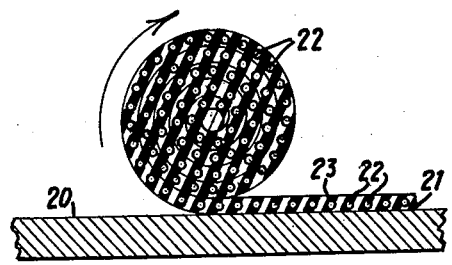
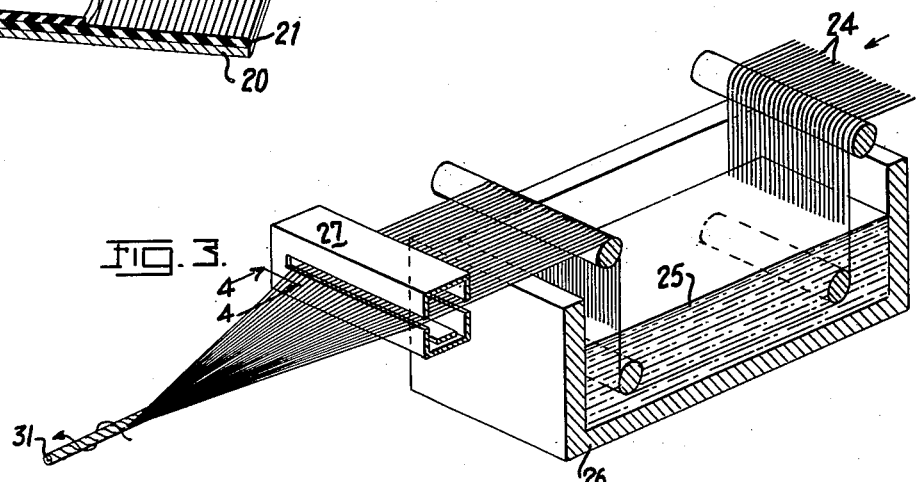
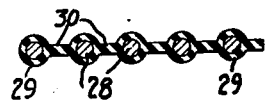
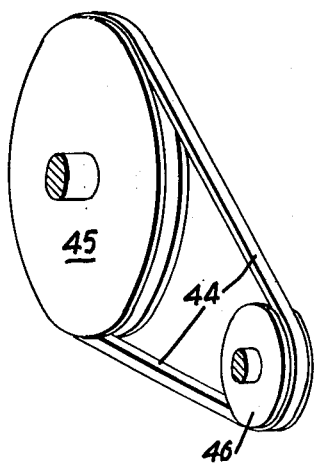
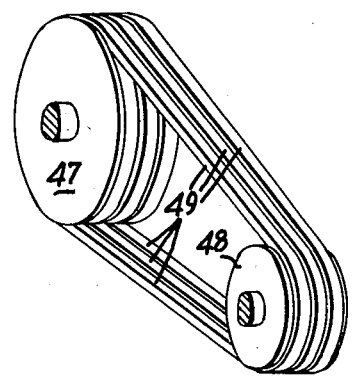
INVENTORS
MELVIN A CROSBY
BY ENRIQUE L. LUACES
Toulmin & Toulmin
ATTORNEYS

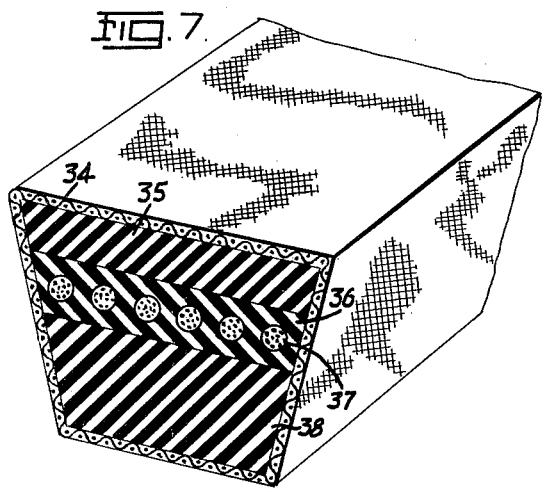
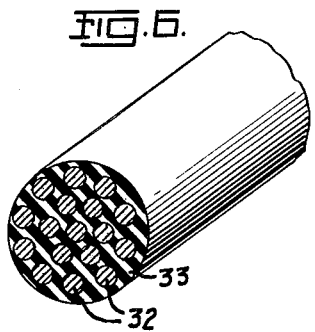
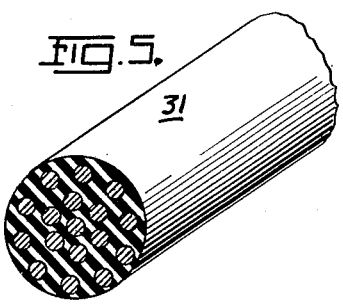
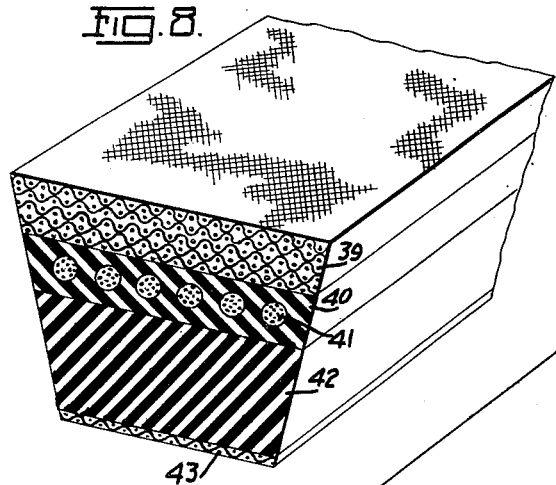
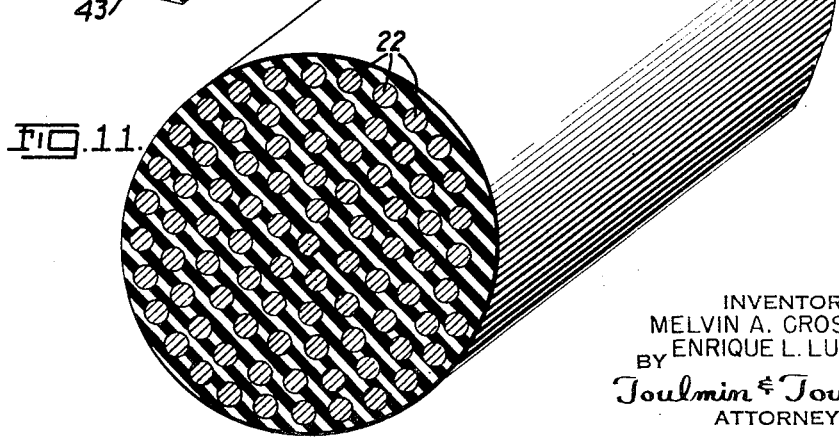
INVENTORS
MELVIN A. CROSBY
ENRIQUE L. LUACES
BY Toulmin & Toulmin
ATTORNEYS Patented Dec. 11, 1951

2,577,843

UNITED STATES PATENT OFFICE 2,577,843

METHOD OF MANUFACTURING WIRE CORD

Melvin A. Crosby and Enrique L. Luaces, Dayton, Ohio, assignors to The Dayton Rubber Company, a corporation of Ohio Original applications March 8, 1943, Serial No. 478,428, and December 14, 1946, Serial No. 716,348. Divided and this application December 14, 1946, Serial No. 716,347

1 Claim. (Cl. 154—91)

This invention relates to the manufacture of V-belts, and more particularly deals with a method whereby belts reinforced with wire may be manufactured.

This application is a division of our copending applications, Serial Number 478,428, filed March 8, 1943, now abandoned; and Serial No. 716,348, filed December 14, 1946, now Patent No. 2,500,523.

In the past V-belts have been made generally with a neutral axis section comprising a plurality of cords of cotton or similar textile material of porous or absorbent nature laid parallel to each other and along the longitudinal axis of the belt.

More recently, efforts have been made in substituting fine metal wire for the textile cords, but since the wire is non-porous and non-absorbent, great difficulty has been experienced in obtaining a firm bond between the wire and the rubber composition of which the belt body is made.

The adhesiveness of the rubber composition to the wire increases as the diameter of the wire decreases, but since the strength of the wire decreases as its diameter decreases, it is not feasible to reduce the diameter of the wire as much as might be necessary to obtain the best possible bond between the wire and the rubber composition.

In order to increase the adhesion between the wire and the rubber composition the wire is frequently subjected to electrochemical or electrolytical treatment. For example, steel wire may be plated with copper and the adhesion between the wire and the rubber thus increased because the thin copper plate on the wire appears to react chemically with sulfur or sulfur compounds in the rubber composition and thereby to form a chemico-mechanical bond between the wire and the rubber composition forming the body of the belt. While this procedure is satisfactory and improves greatly the bond between the wire and the rubber composition, it presents certain inconveniences and is, in a sense, impractical because the wire must be utilized in the manufacture of belts shortly after it has been plated as otherwise passivation takes place and the advantageous action between the copper plate and the sulfur or sulfur compounds in the rubber composition diminishes rapidly and ultimately becomes negligible.

The primary purpose of the present invention is to provide means whereby the adhesion between metal wire used in place of textile cord and the rubber composition forming the body of the belt being manufactured may be increased by means which does not possess the undesirable characteristics and disadvantages which have just been mentioned with respect to electroplated wire.

According to the present invention, fine steel wire (0.004 to 0.005 inch diameter) is coated with rubber composition by dipping or otherwise and then formed into a cable thus providing a cable in which each strand of wire is covered by a film of rubber composition which provides a firm mechanical bond between the several strands forming the cable and between the cable and rubber composition in which it may be embedded.

In one other form of the present invention fine steel wire may be placed over a thin layer of rubber composition, covered with a second thin layer of rubber composition, and the resulting "sandwich" in which the wire is the "meat" is rolled around the longitudinal axis of said wires. In this form of the invention the several strands of wire are covered with film of rubber composition and as the assembly is rolled up, the several rubber coated strands unite with each other to form a unitary body which may be employed in place of cords particularly in the larger sizes.

The nature of the present invention will be better understood from the following description taken in connection with the annexed drawings in which:

Fig. 1 is a view showing the manner in which fine wire may be placed over a thin layer of rubber composition and covered with a second thin layer of rubber composition to form a "sandwich";

Fig. 2 illustrates the manner in which the "sandwich" of Fig. 1 is rolled to form a cord of our invention;

Fig. 3 illustrates the manner in which a plurality of strands of fine wire may be coated with rubber composition and then twisted to form a cable;

Fig. 4 is a view taken along line 4—4 of Fig. 3 and illustrates the manner in which the individual strands of wire are covered with a thin film of rubber composition and united to each other by a web of rubber composition;

Fig. 5 illustrates in perspective and partly in cross section the cable which results from the cabling operation illustrated in Fig. 3;

Fig. 6 is a perspective view partly in cross section showing the article which results when bunched fine wires are immersed in rubber composition to produce an uncabled wire cord;

Fig. 7 is a perspective view partly in cross section showing the manner in which the wire cords of Fig. 5 or Fig. 6 or Fig. 11 may be employed in building a wrapped type V-belt;

Fig. 8 illustrates the manner in which the wire cord of Fig. 5 or Fig. 6 or Fig. 11 may be employed in the building of a raw edge type of V-belt;

Fig. 9 illustrates the manner in which the belt of Fig. 7 or Fig. 8 may be used in a single belt drive;

Fig. 10 illustrates the manner in which the belt of Fig. 7 or Fig. 8 may be employed in a multi-belt drive; and Fig. 11 is a perspective view partly in cross-section showing the cord resulting from the operations illustrated in Figs. 1 and 2.

Referring now to the drawings in detail, in Fig. 1 the numeral 20 is a table top or other similar smooth surface on which there is deposited a thin film of rubber composition 21. Thereover there are placed a plurality of spaced strands of fine wire 22 which are covered by a top layer of rubber composition 23. In Fig. 2 there is illustrated the manner in which the laminated article of Fig. 1 is rolled around the longitudinal axis of said wires to form a plurality of involute layers.

Referring now to Fig. 3, the numeral 24 represents strands of fine wire which are dipped in a solution 25 held in a vessel 26. The solution 25 may consist, for example, of rubber composition dissolved in a suitable solvent. As the strands leave the bath 25 coated with a thin film of rubber composition they are passed through a hotbox 27 wherein the solvent is evaporated substantially completely so that the rubber covered strands of wire leaving the box 27 are substantially dry but remain somewhat tacky and adhesive with respect to each other. The rubber covered strands, as they leave the hotbox 27, will appear as shown in Fig. 4 and will comprise a plurality of wire strands 28 covered with a thin film of rubber composition 29 and held together by a web of rubber composition 30. The rubber covered strands of wire are twisted to form a cord as illustrated in Fig. 3 at 31. The cable 31 produced as shown in Fig. 3 is illustrated in an enlarged manner in Fig. 5.

While in Fig. 3 the several strands of wire are shown entering the bath side by side and substantially equidistantly spaced, this procedure need not be followed exactly although it does provide certain benefits from the point of view of uniformity of the cable ultimately obtained. For example, a plurality of strands of fine wire may be bunched and dipped in the rubber composition. The rubber covered article thus obtained is illustrated in Fig. 6 and consists of a plurality of wire strands 32 embedded in and covered with rubber composition 33.

Depending on the diameter and number of wires which are used to form the wire cord of Fig. 5 or Fig. 6, these cords may be used directly or they may be employed in the manufacture of cables of greater diameter either by twisting together several such cords or by braiding them to form a cable of larger diameter. The diameter of the cord obtained according to the method illustrated in Fig. 1 and Fig. 2 will depend on the width of the laminated sheet which is rolled to form the cord, the diameter of the final article depending on the length of the sheet which is rolled to form it. Likewise, the cord resulting from the method illustrated in Figs. 1 and 2 may be used directly as a cord or may be united with other similar cords either by twisting into a cable or by braiding to form a cable of larger diameter.

The belt illustrated in Fig. 7 consists of a wrapper 34, a tension section 35, a neutral axis section 36 including a plurality of wire cords 37 and a compression section 38, while the belt illustrated in Fig. 8 comprises a plurality of layers of rubberized fabric 39 forming the tension section, a neutral axis section 40 including a plurality of wire cords 41, a compression section 42 and a covering 43 of rubberized fabric on its underside. The former is known as a wrapped belt while the latter is known as a raw edge belt. They are illustrated as having smooth top and bottom surfaces, but the wire cords of the present invention may be utilized in making wrapped belts and raw edge belts having cogs on the underside or on the top or on both the top and undersides.

In Fig. 9 there is illustrated the manner in which a single belt 44 may be utilized for driving conjointly pulleys 45 and 46, and in Fig. 10 there is illustrated the manner in which pulleys 47 and 48 may be driven by a plurality of V-belts 49. The single belt 44 and the multiple belts 49 could be of the type illustrated in Fig. 7 and in Fig. 8.

In the making of the wire cords illustrated in Figs. 2, 5 and 6, it will be noted, the rubber composition not only thoroughly covers the several strands of wire but also provides a complete outer cover for the cord. When the rubber composition hardens by vulcanization in the course of the curing or vulcanizing of the belt in which the cords are used, the rubber composition securely anchors the several strands of fine wire and holds them together in a permanent and strong bond thus forming a unitary article, and since the outer surface of the cord consists of rubber composition, this outer covering likewise hardens by vulcanization and forms an integral structure with the other sections of the belt. If the wire cables of Figs. 2, 5 and 6 are further cabled by twisting or by braiding to form cables of greater diameter and greater strength, the same conditions exist and in the ultimate an integral structure is obtained.

Belts provided with wire cords such as described and illustrated in the present application are substantially better in service than similar belts in the manufacture of which the orthodox textile cord has been employed. Since the elasticity of metal is less than that of cotton, for example, belts made with wire cord such as the wire cord of the present invention will resist stretch to a greater extent and will thus prove more satisfactory because they will cause less slippage and will thus transmit more power. Tests indicate that belts having wire cords give a service life from four to seven times greater than belts of the identical design in which the orthodox type of cotton cords has been used.

It will be understood that while we have illustrated and described certain embodiments of our invention, it is not our intention to have our invention limited to or circumscribed by the specific details of construction, arrangement of parts, materials, procedures or proportions mentioned or illustrated in view of the fact that our invention is susceptible to modifications according to individual conditions and preference without departing from the spirit of this disclosure and the scope of the appended claim.

We claim:

The method of manufacturing a wire cord which comprises applying a thin coating of rubber composition on a surface; placing thereover a plurality of fine wires lying parallel to and spaced from each other; depositing thereover a second thin layer of rubber composition; and rolling the resulting laminated body around the longitudinal axis of said wires in a plurality of involute layers to form a cord.

MELVIN A. CROSBY.
     E. L. LUACES.

REFERENCES CITED

The following references are of record in the file of this patent:

UNITED STATES PATENTS

| Number | Name | Date |
|---|---|---|
| 1,191,876 | Dew | July 18, 1916 |
| 1,437,870 | Swinehart | Dec. 5, 1922 |
| 1,520,342 | Grabau | Dec. 23, 1924 |
| 1,544,217 | Castricum | June 30, 1925 |
| 2,143,694 | Hauvette | Jan. 10, 1939 |
| 2,321,580 | Conradson | June 15, 1943 |
| 2,425,575 | Suloff | Aug. 12, 1947 |

FOREIGN PATENTS

| Number | Country | Date |
|---|---|---|
| 17,359 of 1928 | Australia | Oct. 22, 1929 |